United States Patent [19]

Kilmer

[11] 4,265,019

[45] May 5, 1981

[54] FILAMENT VEGETATION TRIMMER

[76] Inventor: Lauren G. Kilmer, 1927 E. 35th Pl., Tulsa, Okla. 74105

[21] Appl. No.: 958,519

[22] Filed: Nov. 7, 1978

Related U.S. Application Data

[63] Continuation-in-part of Ser. No. 771,400, Feb. 23, 1977, abandoned, which is a continuation of Ser. No. 958,518, Nov. 7, 1978.

[51] Int. Cl.³ ............................................. A01D 50/00
[52] U.S. Cl. ......................................... 30/276; 56/12.7
[58] Field of Search .................. 30/276, 347; 56/12.7, 56/295

[56] References Cited

U.S. PATENT DOCUMENTS

| | | | |
|---|---|---|---|
| 3,664,102 | 5/1972 | Reber | 56/295 |
| 3,877,146 | 4/1975 | Pittinger | 30/347 |
| 3,928,911 | 12/1975 | Pittinger, Jr. | 30/276 |
| 4,118,864 | 10/1978 | Pittinger, Sr. et al. | 30/276 |

FOREIGN PATENT DOCUMENTS

| | | | |
|---|---|---|---|
| 6938265 | 10/1969 | Fed. Rep. of Germany | 56/12.7 |
| 1281450 | 12/1961 | France | 56/12.7 |

*Primary Examiner*—Jimmy C. Peters
*Attorney, Agent, or Firm*—Head & Johnson

[57] ABSTRACT

Filament-type vegetation trimmer (10) having a rotating hollow output shaft (28) through which monofilament line (22) projecting beyond (56) the gyrator trimming end of the output shaft provides the cutting means to trim grass and weeds. A transverse bar (44) across the output shaft trimming end creates a fulcrum point (52) for the filament which extends through an opening (46) left by the bar.

3 Claims, 10 Drawing Figures

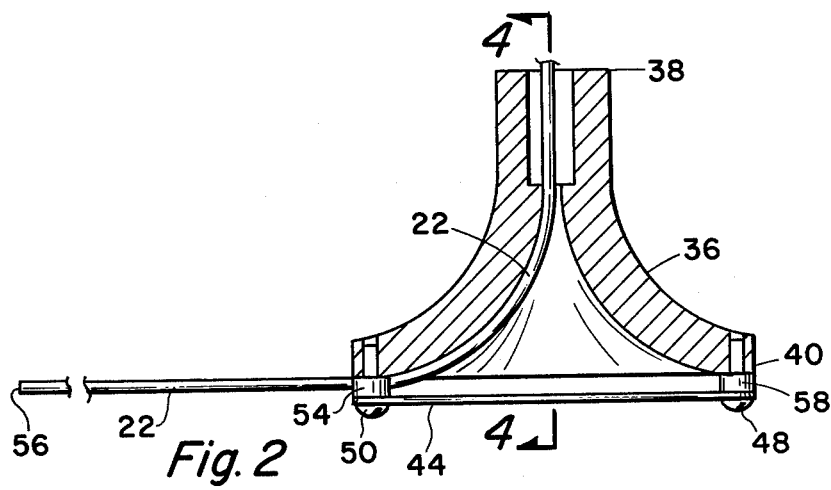
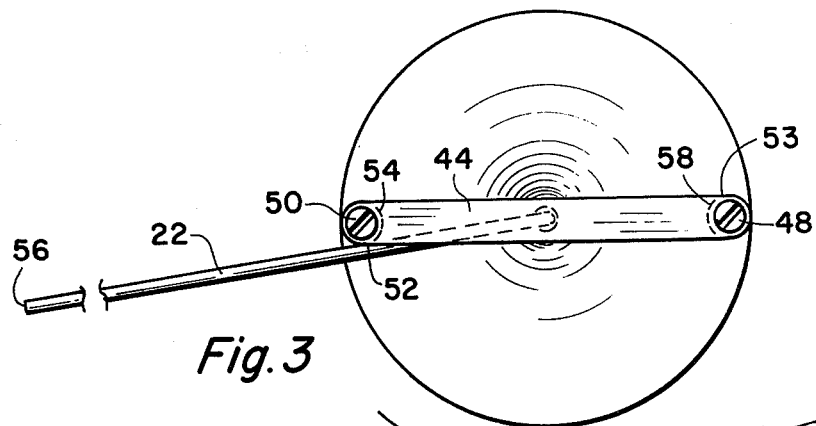
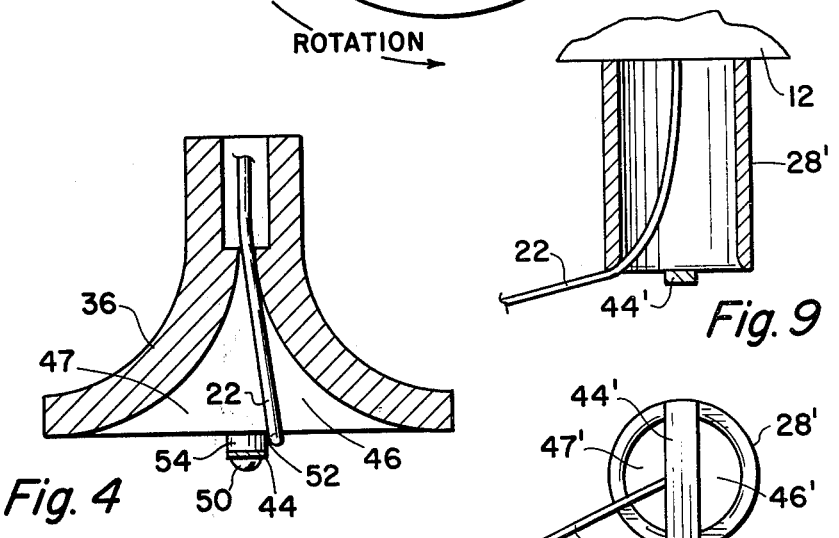

FILAMENT VEGETATION TRIMMER

RELATED APPLICATIONS

This is a continuation-in-part of U.S. application Ser. No. 771,400 filed Feb. 23, 1977 entitled "FILAMENT-TYPE WEED-GRASS TRIMMER", now abandoned, and continuation application Ser. No. 958,518 filed Nov. 7, 1978.

BACKGROUND OF THE INVENTION

Generally, in a filament trimmer, to accomplish rotation of the filament, whereby it may cut grass or weeds, one end of the filament is attached to a rotary means while the other end, together with a selection portion of the filament, projects and rotates freely beyond the assembly. An output shaft, usually a hollow-tubular member, attaches to the rotary means and provides a conduit for the filament through the assembly. Generally, the output shaft outer portion is configured to support or reinforce the gyration or rotation of the filament. For example, in U.S. Pat. No. 3,928,911 a hollow bell-shaped head is attached to the shaft at the trimming end. A groove within the bell mouth is designed to capture the rotating filament and cause its rotation. However, in practical demonstrations this has proved to be impractical, if not impossible. Typically, the bell mouth head begins its rotation independently of the rotation of the filament, and there is no opportunity for the groove in the bell mouth to capture the filament. Indeed, to ensure proper operation, it is necessary to hand enclose the filament in the bell mouth groove before the device is put into operation. Furthermore, because the filament rotates or twists, the filament will tend to rotate out of the groove. Once out of the groove, the filament tends to orient itself axially of the rotating shaft.

This axial alignment is the result of the high speed rotation of the rotary means wherein the upper edge projection of the bell mouth groove drives the filament to the center line of rotation. Since there is no radial force to cause the filament to initially lie in the groove, there is no means for it to catch in the groove for diverting the end into a planar sweep.

Other trimmer devices include a rotary head wherein the filament is a part of that head and rotates therewith. See, for instance, U.S. Pat. Nos. 3,664,102; 3,693,255; 3,708,967; 3,826,068; and 3,831,278. Such devices are known to have a tendency to split the ends of the filament since the exposed sweeping end is oriented always in the same plane; and it is recommended that the split end be trimmed to increase the efficiency of cutting.

In the present application the filament is twisting and untwisting as it sweeps in a planar fashion and presents an ever changing surface to the vegetation to be cut. This results in an even wear surface and a tendency to become pointed which increases the efficiency of cutting.

SUMMARY OF THE INVENTION

Accordingly, it is a purpose of this invention to provide an improved filament vegetation trimmer, which overcomes the problems of prior art devices.

The invention is directed to a filament-type vegetation trimmer having a rotary power drive to which a hollow shaft is attached, such as the axial shaft of an electric motor. At the trimmer end of the shaft, in the broadest aspect of the invention, is a gyrator having a transverse bar provided across at least the center line of the axis of rotation. The point of connection with the shaft acts as a fulcrum or restraining point for the filament so that its end is diverted into a substantially planar path. Sufficient opening is provided to permit passage of filament through the shaft and beyond to a length suitable to effect vegetation cutting and trimming. Variations include a bell mouth gyrator head and other forms of fulcrum creating transverse members to accomplish the same result.

Other advantages and embodiments will be apparent on reference to the attached drawings.

DESCRIPTION OF THE DRAWINGS

FIG. 2 is a cross-sectional view of a gyrator or whirler head embodying the invention.

FIG. 3 is a bottom view of the head.

FIG. 4 is a sectional side view of the head of FIG. 2 when along line 4—4 of FIG. 2.

FIGS. 9 and 10 are partial sectional and bottom views of another aspect of the invention.

DESCRIPTION OF THE PREFERRED EMBODIMENT

U.S. application Ser. No. 771,400 filed Feb. 21, 1977, is incorporated by reference herein.

Figure 1:
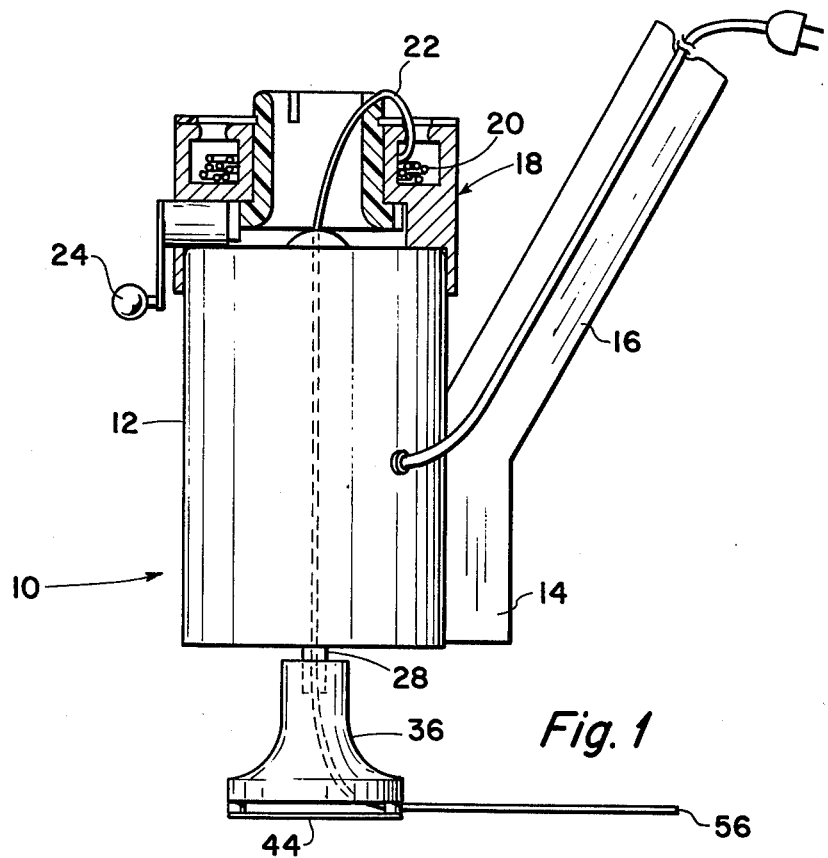
FIG. 1 is a perspective elevational view of a filament trimmer embodying the present invention.

Referring to FIG. 1, reference character 10 generally indicates an improved filament trimmer embodying the concepts of this invention. An electric motor 12 is mounted on frame 14 having a grip or handle 16. A filament reserve chamber 18 is mounted above the motor 12 for holding a coiled supply 20 of filament line 22, which may be selectively released by manual operation of the handle 24, as described in the aforesaid prior application.

The filament 22 passes through a hollow output shaft 28, which in this embodiment comprises the axial shaft of the motor 12, into the gyrator or whirler head 36 through the open space either side of transverse bar 44 and beyond a sufficient distance for cutting or trimming.

The head 36, as the cross-sectional views of FIGS. 2, 3 and 4 show, is a hollow bell-shaped member and has one end 38 attached to the shaft 28. Across the outer end 40 is a transverse bar or restraining member 44 secured at opposite end along one diameter, FIG. 3, by means such as screws 48 and 50. The transverse bar 44 is dimensioned, shaped and configured to permit filament 22 portion 30 to pass outwardly therefrom through openings 46 or 47 on either side of the bar.

Rotational fulcrum or restraining points are created at points 52 or 54 in the direction of rotation as shown in FIG. 3.

In operation of the electric motor 12, the shaft 28 and head 36 will rotate. In the assembly, as illustrated in FIGS. 1, 2, 3 and 4, the filament 22 will be captured at one of the aforesaid fulcrum points to brace the filament to cause its rotation in a substantially horizontal plane. Yet, the filament is free to twist and untwist to keep the end 56 sharp instead of split or frayed as is common with the filament trimmers in the prior art.

Thus, two essential elements of this invention are (1) the transverse arm situated across the axial centerline of the shaft or head and (2) a fulcrum or restraining point to capture or engage the protruding filament at point adjacent the head. These two elements are further illustrated in the other embodiment of FIGS. 5, 6, 7, and 8.

Figures 5, 6, 7, 8:
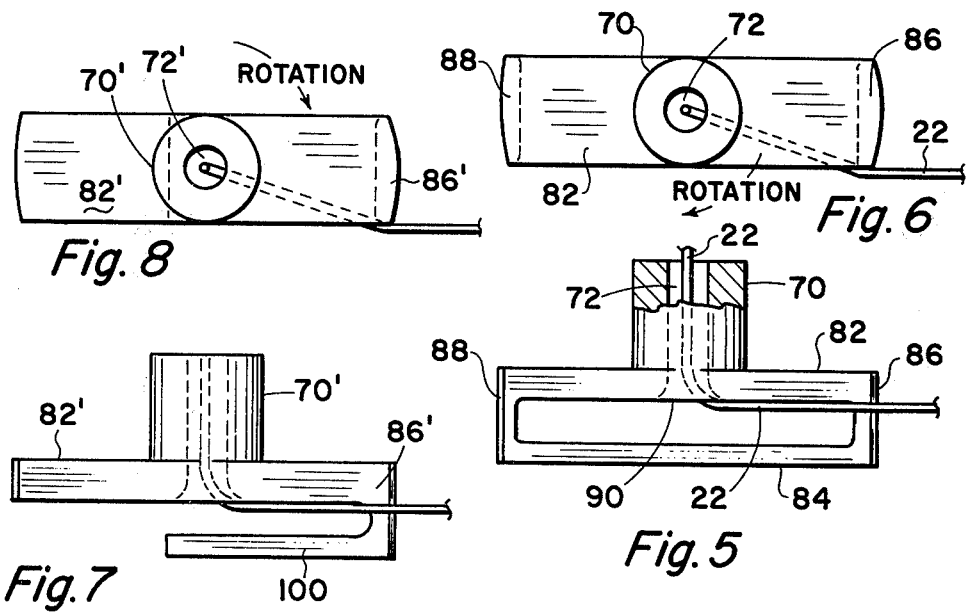
FIG. 5 is a side elevational view of another embodiment of this invention.
FIG. 6 is a top view of the head of FIG. 5.
FIG. 7 is a side elevational view of still another embodiment of the invention.
FIG. 8 is a top view of the head of FIG. 7.

In FIGS. 5 and 6 the head has a sleeve 70 attachable to shaft 28 with an opening 72 therethrough for filament 20. Upper transverse member 82 and lower transverse bar 84 are interconnected by vertical cross members 86 and 88 (fulcrum points) creating space 90.

FIGS. 7 and 8 are similar to FIGS. 5 and 6 except that a single transverse bar 100 extends across the opening 72 at least across the axis of rotation.

It should be reiterated that, while the description herein has referred to a gyrator or whirler type head, the exact shape may vary with the different manufacturers. Indeed, oftentimes there may be no need for a separately defined head and the output shaft may be adapted to serve the same function, as shown in FIGS. 9 and 10 where shaft 28' has a transverse bar 44' thereacross to create spaces 46' and 47' for the filament to pass through.

While the invention has been described in relation to the attached drawings, it should be understood that other and further modifications, apart from those shown or suggested herein, may be used within the spirit and scope of this invention. For instance, as used herein filament is meant to be inclusive of mono-filament lines constructed of thermoplastic or thermosetting elastomeric or like materials. Materials such as the preferred polyamides (nylon), or polyolefins, polyvinyl chlorides, monomers, and other like materials which may yet be devised are inclusive of the invention.

It is claimed:

1. In a filament vegetation trimmer having a rotary drive means, a hollow shaft attached to the drive means, said shaft terminating at a trimming or gyrational end, a gyrator head attached to said shaft at said trimming end and having a bell-shaped opening axial with the said shaft,
   means to supply the filament through said shaft and said a bell-shaped opening, the improvement comprising a transverse bar attached to said gyrator head across at least the center axis of the bell-shaped opening,
   said bar to define a rotational fulcrum point for said filament and sufficient opening between said bell-shaped opening and at least one side of said bar for passage of said filament therethrough and outward to form a rotary whip for trimming.

2. In a filament vegetation trimmer having a rotary drive means, a hollow shaft attached to the drive means, said shaft terminating at a trimming or gyrational end,
   means to supply the filament through said shaft to and beyond said trimming end, the improvement comprising:
   a gyrator head attached to the trimming end of said shaft, said head comprising a sleeve having an opening for said filament therethrough that is axial with said shaft, an upper transverse spaced member attached to said sleeve, a lower transverse bar, said member and said bar interconnected by cross members at each end, said lower transverse bar extending across the axis of rotation of said shaft, wherein said cross members create rotational fulcrum points for said filament.

3. In a filament vegetation trimmer having a rotary drive means, a hollow shaft attached to the drive means, said shaft terminating at a trimming or gyrational end,
   means to supply the filament through said shaft to and beyond said trimming end, the improvement comprising:
   a head attached to said trimming end of said shaft, said head comprising a sleeve having an opening for said filament therethrough that is axial with said shaft, an upper transverse member attached to said sleeve, a lower transverse bar interconnected at one end by a cross member, said bar extending across at least the axial center line of said sleeve opening, and wherein said cross member creates a rotational fulcrum point for said filament.

* * * * *